United States Patent [19]
Foster

[11] Patent Number: 5,850,905
[45] Date of Patent: Dec. 22, 1998

[54] RECIPROCATING SLAT CONVEYORS WITH PRESSURE SEALS

[76] Inventor: Raymond Keith Foster, P.O. Box 1, Madras, Oreg. 97741

[21] Appl. No.: 896,203

[22] Filed: Jul. 17, 1997

Related U.S. Application Data

[63] Continuation-in-part of Ser. No. 832,370, Apr. 2, 1997, Pat. No. 5,727,672.

[51] Int. Cl.⁶ .................................................. B65G 25/00
[52] U.S. Cl. .................................. 198/750.3; 198/750.4; 414/525.9
[58] Field of Search ............................. 198/750.3, 750.4; 414/525.1, 525.9

[56] References Cited

U.S. PATENT DOCUMENTS

| | | | |
|---|---|---|---|
| Re. 35,022 | 8/1995 | Foster | 198/750 |
| 5,088,595 | 2/1992 | Hallstrom | 198/750 |
| 5,165,524 | 11/1992 | Foster | 198/750 |
| 5,165,525 | 11/1992 | Quaeck | 198/750 |
| 5,222,592 | 6/1993 | Quaeck | 198/750 |
| 5,228,556 | 7/1993 | Quaeck | 198/750 |
| 5,323,894 | 6/1994 | Quaeck | 198/750 |
| 5,390,781 | 2/1995 | Foster | 198/750 |
| 5,560,472 | 10/1996 | Gist | 198/750 |
| 5,605,221 | 2/1997 | Foster | 198/750 |

*Primary Examiner*—Joseph E. Valenza
*Attorney, Agent, or Firm*—Delbert J. Barnard

[57] ABSTRACT

Side-by-side conveyor slats (62) have laterally outwardly extending opposite upper side portions (72,74), each including a depending, longitudinal support and seal bead (B) having a lower edge that contacts and slides along a longitudinal bearing/seal surface (78) on a longitudinal support beam (14) that is below it. The conveyor slats (62) have laterally spaced apart depending leg portions (24, 26), each with a laterally outwardly directed flange (64, 66). These flanges (64,66) are offset vertically below the upper side portion (72, 74) on its side of the conveyor slat (62). A longitudinal support beam (14) is positioned between each adjoining pair of conveyor slats (62), below adjacent upper side portions (72, 74) of the adjoining conveyor slats (62). A longitudinal bearing/seal member (80) is supported on, extends along and is connected to each support beam (14). The longitudinal bearing/seal members (80) have side portions that project laterally outwardly from opposite sides of the support beams (14), each into a position that is above an adjacent outwardly directed flange (64, 66) on an adjacent depending leg (68, 70) of an adjoining conveyor slat (62), for blocking upward movement of the conveyor slats (62) up off of the bearing/seal members (80).

9 Claims, 7 Drawing Sheets

RECIPROCATING SLAT CONVEYORS WITH PRESSURE SEALS

RELATED APPLICATION

This is a continuation-in-part of my application Ser. No. 08/832,370, filed Apr. 2, 1997, and entitled Pultruded Conveyor Slats now U.S. Pat. No. 5,727,672, granted Mar. 17, 1998.

TECHNICAL FIELD

This invention relates to reciprocating slat conveyors. More particularly, it relates to the provision of reciprocating slat conveyors having pressure seal systems formed by longitudinal, depending support and seal beads on the conveyor slats and longitudinal bearing/seal members on support beams that are positioned between the conveyor slats.

BACKGROUND OF THE INVENTION

U. S. Pat. No. 5,560,472, granted Oct. 1, 1996, to Richard T. Gist, discloses a conveyor slat, bearing, support beam, and seal system which eliminates elastomeric seal members between the conveyor slats which have for many years characterized most of the known reciprocating slat conveyors. In this system, longitudinal support beams are positioned laterally between the conveyor slats. Upper portions of the support beams provide upwardly directed, hard plastic, bearing/seal surfaces. The conveyor slats have upper side portions that overhang the bearing/seal surfaces. These upper side surfaces of the conveyor slats include depending, longitudinal beads that contact and ride on the bearing/seal surfaces. The weight of the conveyor slats, and the weight of any load on the conveyor slats, is transmitted from the conveyor slats to the longitudinal support beams. This weight transfer occurs where the longitudinal slat beads contact and ride on the bearing/seal surfaces. The contact is a narrow line contact. Because the contact occurs along a relatively narrow line, a substantial force is generated which urges the longitudinal beads into a tight sealing contact with the bearing/seal surfaces where there is a load on the conveyor slats. However, because contact occurs along a relatively narrow line, the area of contact is small, resulting in the forces necessary to reciprocate the conveyor back and forth along the support beams being smaller. An object of the present invention is to provide improvements to the pressure seal system that is disclosed by U. S. Pat. No. 5,560,472, for the purpose of making it easier to manufacture and install the components of the system, and to better the ability of the system to rid itself of small particulate material during times when there is no load on the conveyor slats.

The following United States patents show some prior art conveyor systems having some superficial appearance similarity to the systems of the present invention: U.S. Pat. No. 5,088,595, granted Feb. 18, 1992, to Olof A. Hallstrom; U.S. Pat. No. 5,165,525, granted Nov. 4, 1992 to Manfred W. Quaeck; U.S. Pat. No. 5,222,592, granted Jan. 29, 1993, to Manfred W. Quaeck; U.S. Pat. No. 5,228,556, granted Jul. 30, 1993, to Manfred W. Quaeck; and U.S. Pat. No. 5,323,894, granted Jun. 28, 1994, to Manfred W. Quaeck. These patents should be carefully considered for the purpose of putting the present invention into proper perspective relative to the prior art.

DISCLOSURE OF THE INVENTION

Some embodiments of the present invention are basically characterized by side-by-side conveyor slats, each having laterally outwardly extending opposite upper side portions. Each upper side portion includes a depending, longitudinal support and seal bead having a lower edge that contacts and slides along a longitudinal bearing/seal surface on a longitudinal support beam that is below it. The conveyor comprises a longitudinal support beam positioned between each adjoining pair of conveyor slats. Each support beam is below adjacent upper side portions of the adjoining conveyor slats. A longitudinal bearing/seal member is supported on, extends along and is secured to each support beam. A longitudinal tongue-and-groove connection is provided between the support beam and the bearing/seal member. This connection comprises longitudinal tongues on one of the support beams and bearing/seal member and longitudinal grooves on the other.

In some embodiments, the support beam has a top portion composed of a pair of confronting, laterally inwardly directed flanges. The flanges define a longitudinal slot opening between them. The longitudinal bearing/seal member has opposite side slots in which the flanges are received. They also include an upper portion that is above the flanges and a lower portion that is below the flanges. The flanges provide the tongue portions and the slots form the groove portions of the tongue-and-groove connection.

In accordance with an aspect of the invention, the longitudinal bearing/seal members have upper surfaces that are laterally convex. These surfaces provide the bearing/seal surface that is in contact with the longitudinal support and seal beads. The convex surface helps facilitate sideways and downward movement of particulate material from the bearing/seal surface to a region below the conveyor. In an embodiment of the invention, the longitudinal bearing/seal members are wider than the support beams. They include side portions that project laterally outwardly beyond the opposite sides of the support beams. These projecting side portions preferably include open areas through which particular material can move, as it travels away from the pressure seals.

According to another aspect of the invention, the support beams each have a top portion that includes an upwardly opening longitudinal channel, with longitudinal grooves extending along the sides of the channel. The bearing/seal member is a longitudinal member that is situated within the channel. It includes tongues extending along its sides that extend into the channel grooves. The upper surface of the bearing/seal member may be laterally convex with such convex surface providing the bearing/seal surface that is in contact with the longitudinal support and seal beads. The support beams in this embodiment preferably include upper side portions flanking the longitudinal channel and the bearing/seal member that is within the channel. These upper side portions of the support beam may also be laterally convex.

Other embodiments of the present invention are basically characterized by side-by-side conveyor slats, each having longitudinally outwardly extending opposite upper side portions. Each upper side portion includes a depending, longitudinal support and seal bead having a lower edge that contacts and slides along a longitudinal bearing/seal surface on a longitudinal support beam that is below it. The conveyor slats each have an upper portion including the said upper side portions, and laterally spaced apart depending leg portions, each with a laterally outwardly directed bottom flange that is offset vertically below the upper side portion on its side of the conveyor slat. A longitudinal support beam is positioned between each adjoining pair of conveyor slats, below adjacent upper side portions of the adjoining conveyor slats. A longitudinal bearing/seal member is supported on, extends along, and is connected to each said support beam. Each bearing/seal member presents an upwardly directed bearing/seal surface. The longitudinal bearing/seal members have side portions that project laterally outwardly from opposite sides of the support beams, each into a position that is above an adjacent outwardly directed flange and adjacent depending leg of an adjoining conveyor slat. The laterally projecting side portions of the bearing/seal members function to block upward movement of the conveyor slats up off of the bearing/seal members. In some embodiments, the laterally outwardly projecting side portions of the bearing/seal members include open areas through which particulate material can move downwardly.

In an embodiment of the invention, the side portions of the longitudinal bearing/seal members have downwardly and inwardly sloping side flaps. Each such side flap has a sloping lower surface that is faced to contact a said laterally outwardly directed flange on an adjacent depending leg portion of an adjoining conveyor slat.

In accordance with another aspect of the invention, the depending leg portions of the conveyor slats carry seal members. Each seal member extends towards and contacts an adjacent side surface of an adjoining support member. The seal members may be brush seals or they may be elastomeric lip seals. The flaps may serve as leaf springs to urge the conveyor slats downwardly and the beads into tight sealing contact with the bearing/seal surfaces.

In accordance with another aspect of the invention, each support beam has a lower mounting base portion and an upper bearing/seal member mounting portion, and the bearing/seal member is formed (e.g. extruded or pultruded) onto the bearing/seal member mounting portion.

According to a further aspect of the invention, each conveyor slat is supported on its longitudinal support beam in a manner allowing it to move upwardly and provide a vertical space between its longitudinal bead and the longitudinal bearing/seal surface below it preferably, the vertical space is at least about one-eighth of an inch in height. The conveyor slat can move upwardly by this amount before conveyor slat movement-blocking contact occurs between the side portions of the bearing/seal members and the flanges on the conveyor slats. This ability to move upwardly facilitates the ability of the system to rid itself of particulate material.

Additional features, advantages and objects of the invention are described in the detailed description of the best mode and preferred embodiments and/or inherent in the structures that are illustrated and described. Such detailed descriptions, the drawings, and the claims which follow are all parts of the description of the invention.

BRIEF DESCRIPTION OF THE DRAWINGS

In the drawings, like element designations refer to like parts throughout, and.

BEST MODE FOR CARRYING OUT THE INVENTION

A substantially complete reciprocating slat conveyor system is disclosed by my U.S. Pat. No. 5,165,524, granted Nov. 24, 1992 and entitled Reciprocating Floor Conveyor. Such patent discloses one suitable form of drive unit for reciprocating the conveyor slats. Other suitable drive units, each having its own particular advantages, are disclosed by my U.S. Pat. No. 5,390,781, granted Feb. 21, 1995, and entitled Mounting Assembly and Method for Reciprocating Slat Conveyor, by my U.S. Pat. No. Re. 35,022, granted Aug. 22, 1995, and entitled Reduced Size Drive/Frame Assembly for a Reciprocating Floor Conveyor, and by my U.S. Pat. No. 5,605,221, granted Feb. 25, 1997, and entitled Drive Unit With Bearing Mount. The contents of all these patents are hereby incorporated herein by this specific reference.

Figure 7:
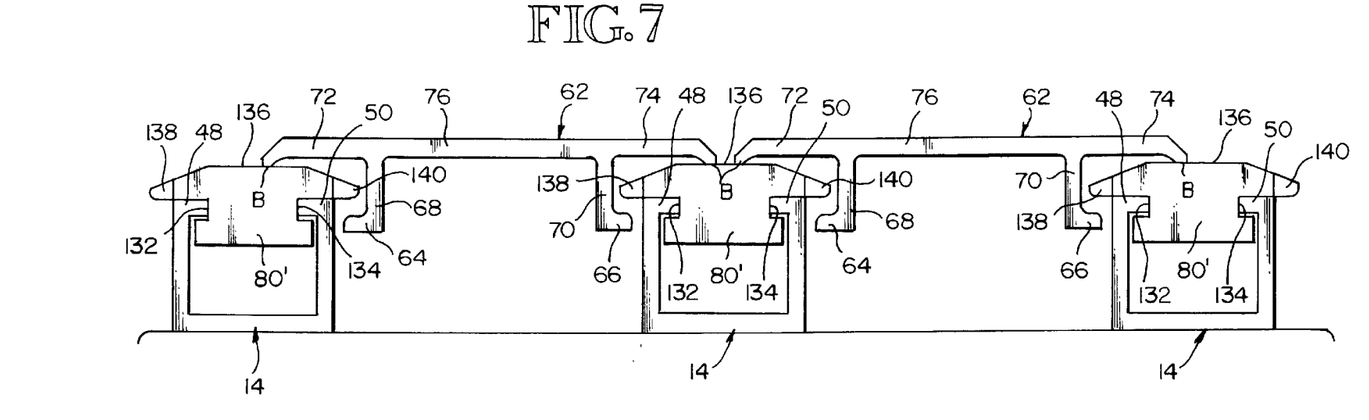
FIG. 7 is a view like FIGS. 1, 2, 5 and 6, but of a further embodiment of the invention.
Figure 8:
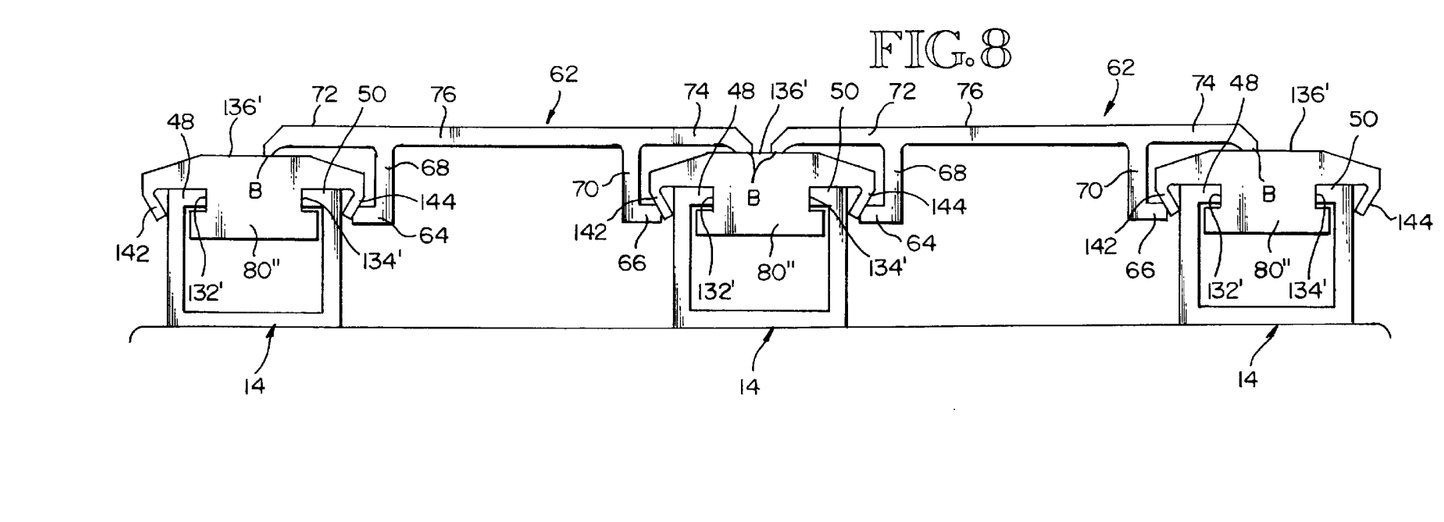
FIG. 8 is a view like FIGS. 1, 2 and 5–7, but of yet another embodiment of the invention.

My aforementioned U.S. Pat. No. 5,165,524, with reference to FIGS. 2–6 of that patent, describes the most popular operational sequence of a reciprocating slat conveyor. FIGS. 7 and 8 of that patent show a typical framework that forms the base of the conveyor. It includes opposite side beams (designated 12 in that patent) interconnected by a plurality of longitudinally spaced apart transverse beams (designated 18 in that patent). Longitudinal guide beams (designated 20 in that patent) are mounted on the transverse beams 18. Bearings (designated 50 in that patent) are secured to the guide beams 20. The conveyor slats (designated 40 in that patent) sit down on and engage the bearings 52. The present invention relates to a similar arrangement but involves a different construction of the conveyor slats, the guiding and supporting beams for the conveyor slats, and the bearing and seal structures that are associated with the conveyor slats.

Figure 1:
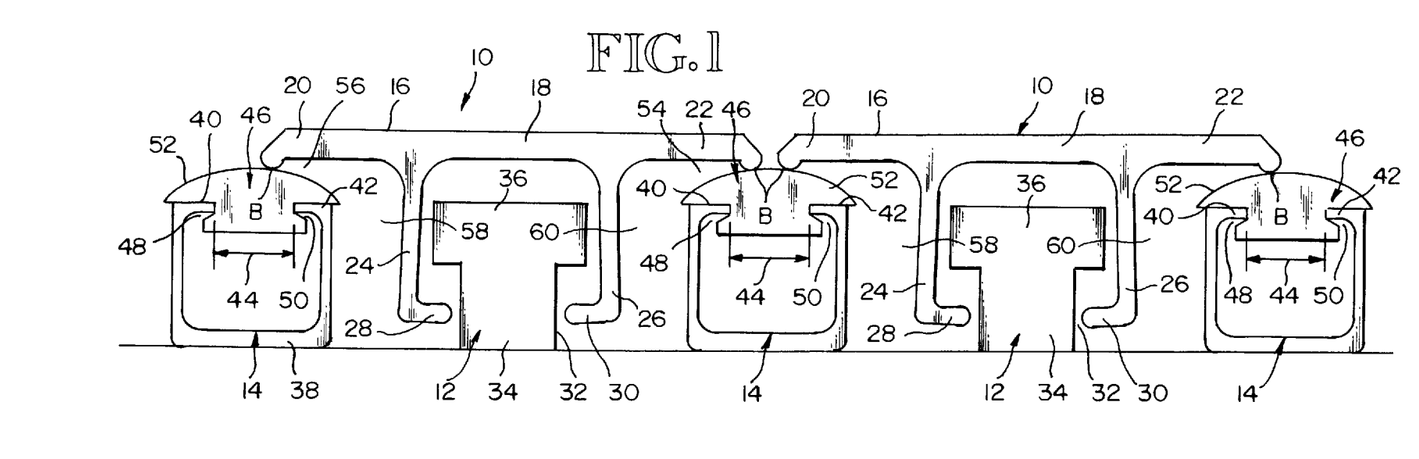
FIG. 1 is a fragmentary end view of a reciprocating slat conveyor, showing three longitudinal support members, two conveyor slats and two longitudinal guide members for the conveyor slats.

FIG. 1 shows a reciprocating slat conveyor construction that is similar to but yet different from the construction disclosed by the aforementioned U.S. Pat. No. 5,560,472. It is similar in that the conveyor slats 10 are guided by longitudinal guide beams 12 and are supported independently of the guide beams 12 by longitudinal support beams 14. The differences lie in the construction of the conveyor slats 10, the guide beams 12 and the support beams 14. The conveyor slats 10 are elongated members that are formed by extrusion or coextrusion. A typical conveyor may measure somewhere between twelve to twenty-four slats wide and between twenty to fifty feet in length. The conveyor slats 10 may include a plank-like upper portion 16 that measures between three and a half to six inches in width. The upper or plank portion 16 is divided into three sections. There is a center section 18 that is flanked by opposite side sections of 20, 22. Depending legs 24, 26 depend from each location where the center section 18 meets a side portion 20, 22. Each depending leg 24, 26 includes a laterally inwardly directed bottom flange 28, 30. The flanges 28, 30 define between them a longitudinally extending slot opening 32. The guide beams 12 each have a narrow base portion 34 and a wider top portion 36. The base portion 34 is narrower than the slot opening 32 whereas the top portion 36 is wider than the slot opening 32. Preferably, there is a loose fit of the conveyor slats 10 on the guide beams 12. This is done so that when there is no load on the conveyor slats 10, the conveyor slats 10 can move in position relative to the guide beams 12, both horizontally and vertically. The purpose of this feature is described later in this document.

In the embodiment of FIG. 1, the support beams 14 comprise hollow longitudinal beam members 38 that are preferably extruded from a structural aluminum alloy. Preferably the beam members 38 each include a top portion composed of a pair of confronting, laterally inwardly directed flanges 40, 42, defining between them a longitudinal slot opening 44. A longitudinal bearing/seal member 46 is positioned upon, extends along and is connected to each support beam 38. Preferably, there is a tongue-and-groove connection of the bearing/seal member 46 to the support beam 38. In the embodiment of FIG. 1, the flanges 40, 42 provide the longitudinal tongues. Longitudinal slots 48, 50, formed in the sides of the bearing/seal members 46, provide the grooves. As illustrated, the bearing/seal member has an upper portion that is situated above the flanges 40, 42 and a lower portion that is situated below the flanges 40, 42. The upper and lower portions are both wider than the slot opening 44. The upper portion is substantially as wide as, or wider than, the support beam 38.

The embodiment of FIG. 1 includes an upper surface on the bearing/seal member 46 that is laterally convex. This surface 52 provides a bearing/seal surface as will hereinafter be described. Preferably, the flanges 40, 42 are sized to be snugly received within the slots 48, 50. The bearing/seal member 46 is slid endwise onto the support member 38. Then, its upper outer side portions may be riveted or otherwise secured to one or both of the flanges 48, 50, in order to prevent bearing/seal member 46 from sliding endwise off of the support beam 38. Of course, other types of fastening methods may be used for securing the bearing/seal members 46 to the support beams 38.

According to the invention, the upper side portions 20, 22 of the conveyor slats 10 each include a depending, longitudinal support and seal bead B having a lower edge that contacts and slides along the longitudinal bearing/seal surface provided by the upper surface 52 of the bearing/seal member 46. The beads B may be depending lips or flanges that form the outer edge boundaries of the side portions 20, 22 of the conveyor slats 10. The lower edges of the beads B may be laterally rounded, laterally sharp edged, or laterally blunt, but making a relatively narrow line contact with the bearing/seal surface.

The bearing/seal members are constructed from a high molecular weight resinous material, sometimes referred to in the trade as UHMW material. Such materials are available from several manufacturers. They are strong and are easily formed to the desired configuration. They have exceptionally low surface abrasion which translates into their providing an excellent bearing relationship between the conveyor slats 10 and the support beams 38. The substantially narrow line contact between the depending beads B and the bearing/seal members 46 provides a seal when there is a load on the conveyor that seals against the passage of particulate material, including "fines" of 100 mesh or smaller, from the region above the conveyor slats 10 to the region below the conveyor slats 10. When the conveyor is under load, the contact of the lower edges of the beads B with the bearing/seal surfaces of the bearing/seal members 46 provides an effective and very simple seal against the movement of particulate material downwardly to below the conveyor slats. Over time, in response to reciprocal movement of the conveyor slats, the contact of the bead edges with the bearing/seal surfaces will form grooves in the bearing/seal surface. At the same time, because the contact of the conveyor slats 10 with the bearing/seal members 46 occurs only along relatively narrow lines, and because the bearing/seal material has very low friction characteristics, there is a minimum of resistance to sliding movement of the conveyor slats 10 front to rear and back along the bearing/seal members 46.

According to an aspect of the invention, the upper surfaces 52 on the bearing/seal members 46 are laterally convex. Also, the surfaces 52 may extend laterally to substantially where they meet the opposite side surfaces of the support members 38. As a result, there are avenues provided which allow fines that do pass the seal regions to rather easily move into the open spaces 58, 60 that are formed between each support beam 14 and the adjacent depending leg portion 24, 26 of the adjoining conveyor slat 10. The convex nature of the surface encourages the fines to gravitate downwardly into the spaces 58, 60.

As discussed above, when there is a load on the conveyor slats 10, the beads B are held into a relatively tight sealing relationship with the bearing/seal surfaces, and the migration of fines from above the conveyor slats 10 to below the conveyor slats 10 is substantially arrested. However, when there is no load on the conveyor slats 10, but some fines remain, motion of the conveyor will cause the conveyor slats 10 to want to move up and down and sideways to some extent. This movement is permitted and in effect encouraged by the fact that the conveyor slats 10 merely set down on the bearing/seal members 46 and there is a loose fit of the guide beams 12 in the space that is defined horizontally between the depending portions 24, 26, and vertically between the top section 18 and bottom flange portions 28, 30, of the conveyor slats 10. As the conveyor slats 10 move up and down and sideways, gaps are opened between the beads B and the bearing/seal members 46. This happens each time the conveyor slats 10 are bounced upwardly off from their support on the bearing/seal members 46. When this happens, the fines migrate through the vertical gaps into the avenues 54, 56. Once in the avenues 54, 56, the fines are influenced by the convex upper surface 52, into migrating into the spaces 58, 60. The guide beams 38 and the support beams 38 extend longitudinally across transverse frame beams which are longitudinally spaced apart. Thus, the material falling into the open regions 58, 60 will gravitate from these regions down through open spaces in the framework, to the ground below the conveyor.

Figure 2:
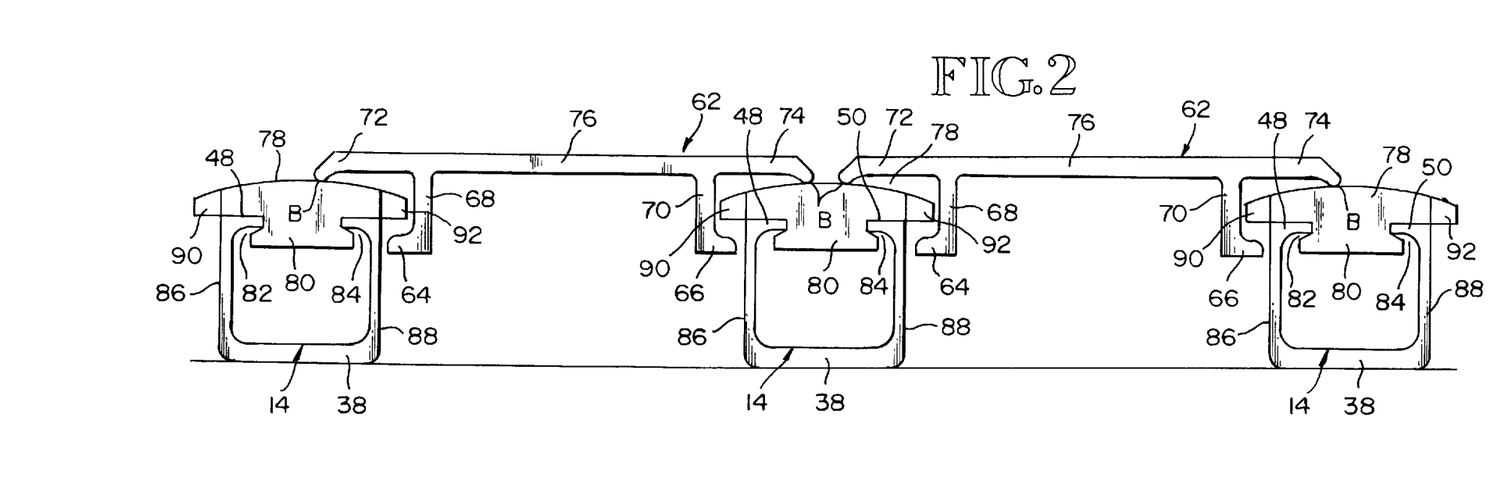
FIG. 2 is a view like FIG. 1 but of a second embodiment in which the longitudinal support members are also the guide members.
Figure 3:
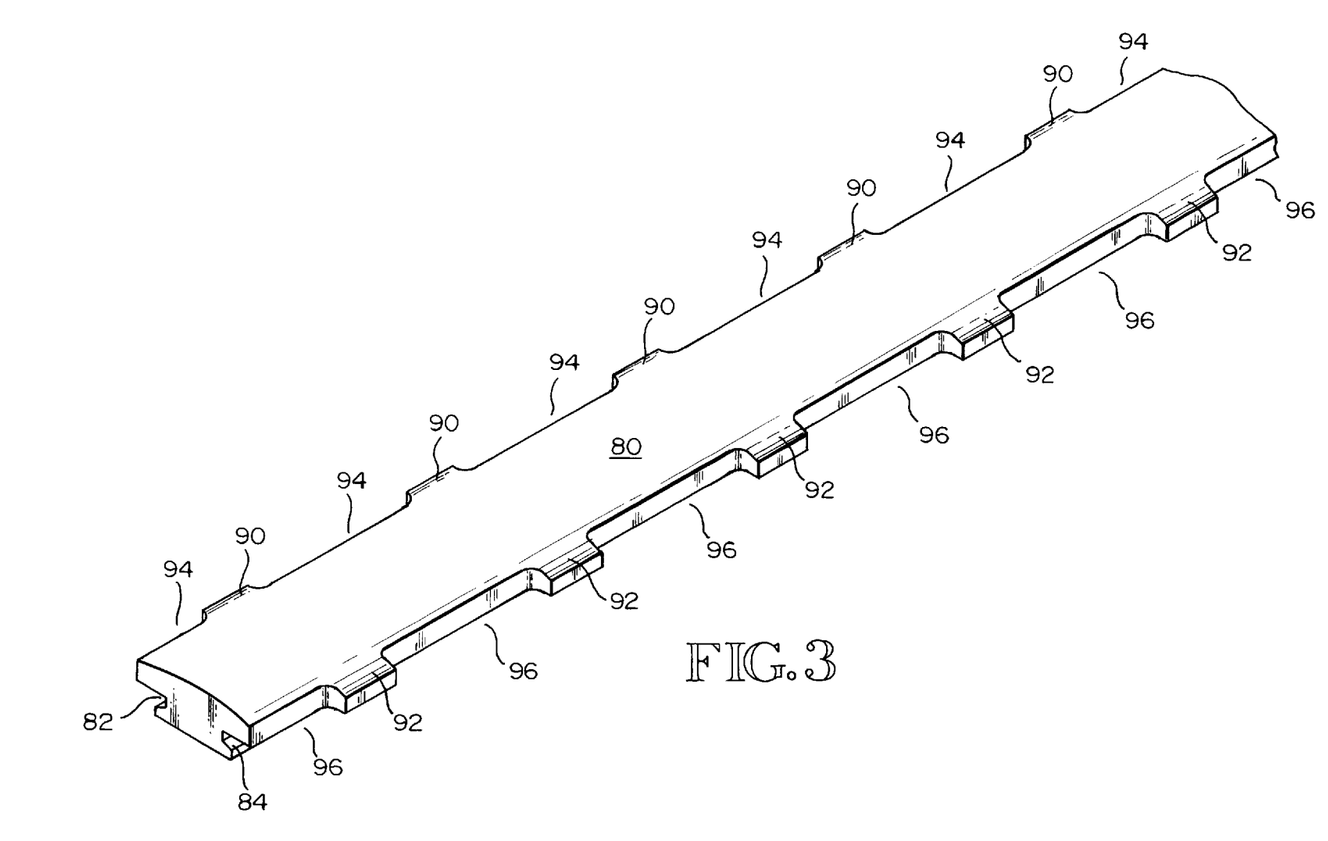
FIG. 3 is a fragmentary pictorial view of the bearing/seal member portion of the embodiment of FIG. 2.
Figure 4:
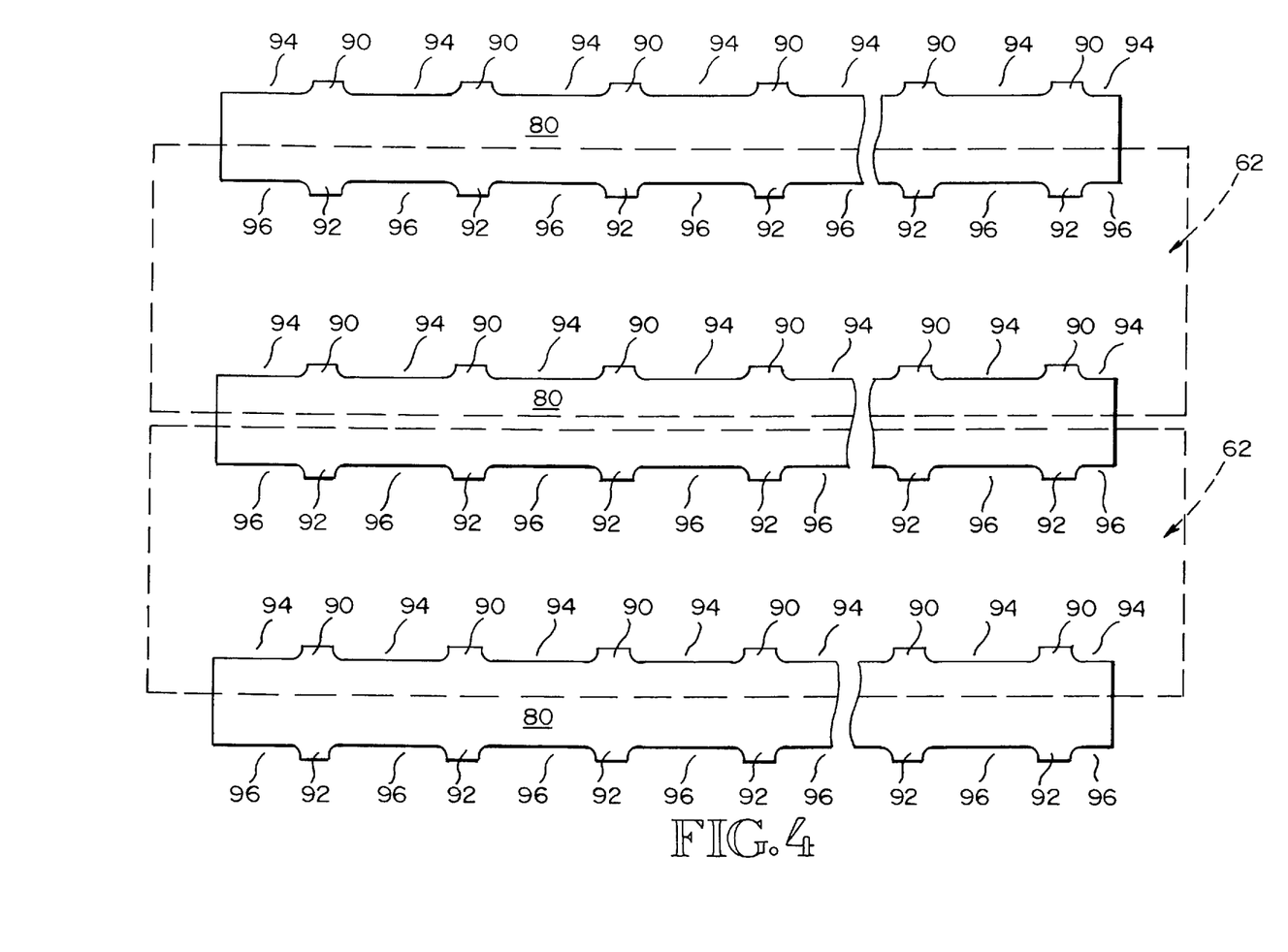
FIG. 4 is a fragmentary plan view of the conveyor shown by FIG. 2, with the bearing/seal members shown by solid lines and the conveyor slats shown by broken lines.

FIGS. 2–4 show a second embodiment of the invention. In this embodiment, the conveyor slats 62 have laterally outwardly directed flanges 64, 66 at the bottoms of the depending legs 68, 70. Like the conveyor slats 10, the conveyor slats 62 have plank-like upper portions composed of upper side portions 72, 74. And a central panel portion 76 between upper side portions 72, 74. The depending legs 68, 70 depend from the regions where the upper side portions 72, 74 meet the opposite side edges of the central panel portion 76. Also like conveyor slats 10, the upper side portions 72, 74 each include a depending, longitudinal support and seal bead B having a lower edge that contacts and slides along a longitudinal bearing/seal surface that is a region of upper surface 78 on bearing/seal members 80. The members 80 include longitudinal slots 82, 84 in which is situated the upper flanges 48, 50 of the longitudinal support beams 14. These slots 82, 84 and flanges 48, 50 form a longitudinal tongue-and-groove connection between the bearing/seal members 80 and the support beams 14. In this embodiment, the upper portions of the bearing/seal members 80 project laterally outwardly beyond the side surfaces 86, 88 of the support beams 14, each into a position that is spaced vertically above an adjacent flange 66 on the adjoining conveyor slat 62. In like fashion, each projecting side portion 92 is spaced vertically above an adjacent flange 64 on another adjoining conveyor slat 62. A vertical gap is formed between bearing/seal member portions 90, 92 and the conveyor slat flanges 64, 66. This space or gap preferably measures at least about one-eighth of an inch. This arrangement allows the conveyor slats to lift the beads B up off of the bearing/seal surfaces by substantially at least about one-eighth of an inch. This upward movement of the conveyor slats 62 would be likely to happen when there is no substantial load on the conveyor slats 62 and the vehicle in which the conveyor is situated is moving. The movement causes the conveyor slats 62 to move up and down. Whenever a conveyor slat 62 is up, and there is a space between its bead B and the bearing/seal surface below it, small particles on this surface, in the gap that is formed between the conveyor slat 62 and the conveyor slat 62 that adjoins it, will move sideways through the gap. This particulate material gravitates sideways towards the adjacent depending leg 68, 70. As best shown in FIGS. 3 and 4, in this embodiment, the bearing/seal member 80 is provided with cutout regions 94, 96 that provide avenues 94, 96 through which the material can migrate downwardly into the region below the conveyor slat 62.

Figure 5:
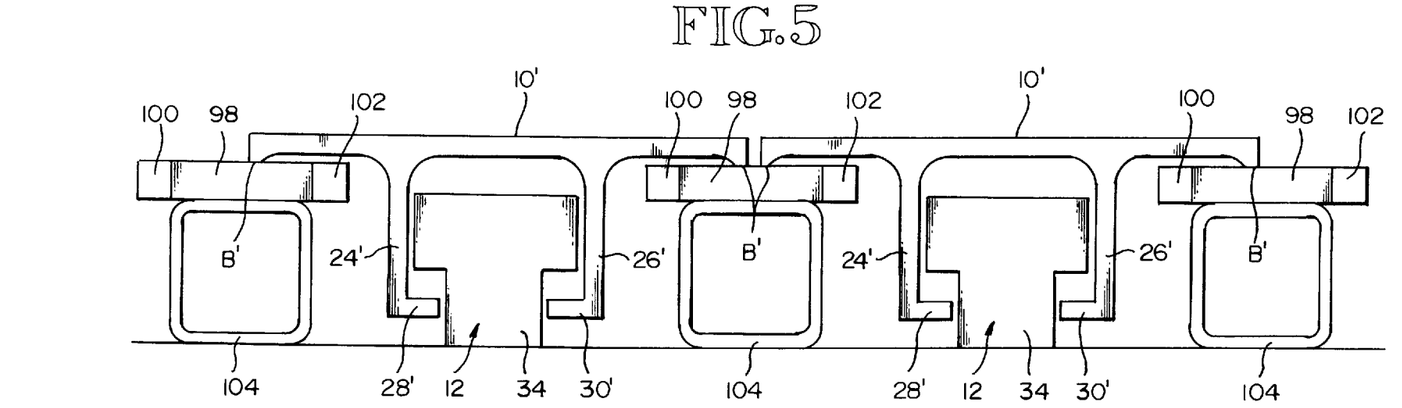
FIG. 5 is a view like FIGS. 1 and 2 but of another embodiment of the invention.

The embodiment of FIG. 5 has bearing/seal members 98 that are like bearing/seal members 80 in that they include cutout regions 100, 102 extending along their sides. The bearing/seal members 98 are riveted or otherwise secured to the tops of longitudinal support beams 104. Thus, the bearing/seal members 98 rest on, extend longitudinally along, and are secured to the support beams 104. In this embodiment, the conveyor slats 10' are provided with guide beams 12 like guide beams 12 in the embodiment of FIG. 1. Guide beams 12 have narrow mounting portions 34 and wider upper portions 36. The upper portions 36 are positioned vertically between the tops of the conveyor slats 10' and the laterally inwardly directed flanges 28', 30' that are at the bottom of depending legs 24', 26'. Top portions 36 are also disposed laterally between the depending legs 24', 26'. As in the embodiment of FIGS. 2–4, the cutout regions 100, 102 permit the migration of material from on the tops of the bearing/seal members 80 downwardly into the space below the conveyor slats 10' and between the support beams 104 and the depending legs 24', 26'. Like in the embodiment of FIG. 1, the conveyor slats 10' have the ability to move vertically a distance until further upward movement is arrested by contact of the flanges 28', 30' with the upper portions 36 of the guide beams 12. As previously explained, the conveyor slats 10' are apt to move upwardly when there is no load on the conveyor slats 10'. Movement of the vehicle of which the conveyor is a part will cause the conveyor slats 10' to "bounce" and this bouncing is what raises the beads B up off of the bearing/seal surface of the bearing/seal members 98. Any particulate material that might have accumulated in the lateral spaces or "gaps" between the conveyor slats 10' will be influenced by the bouncing movement to move laterally outwardly, first into the cutout regions 100, 102 and then into the regions between the depending legs 24', 26' and the support beams 104. Because the guide beams 34 and the support beams 104 are connected to longitudinally spaced apart transverse frame members, these spaces between the support beams 104 and the depending legs 24', 26' lead downwardly to the ground below the conveyor.

Figure 6:
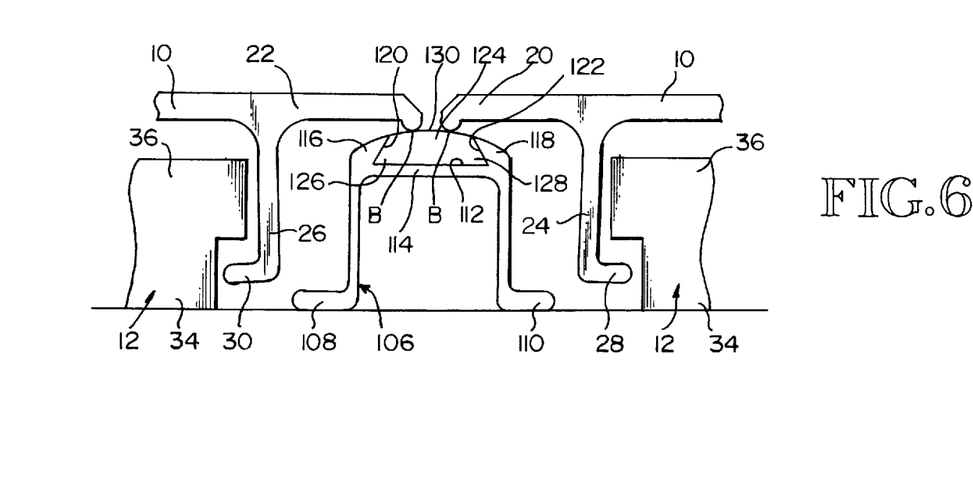
FIG. 6 is a view like FIGS. 1, 2 and 5 but showing only a single longitudinal support member and fragmentary portions of the conveyor slats that are supported by such support member.

FIG. 6 includes conveyor slats 10 that are like the conveyor slats shown by FIG. 1. They are guided by guide beams 12 having mounting portions 34 and wider upper portions 36. In this embodiment, the support beams 106 are downwardly opening channel members having laterally outwardly projecting bottom flanges 108, 110. These flanges 108, 110 may be riveted or otherwise secured to a base frame structure, e.g. longitudinally spaced apart transverse frame beams. The upper portion of the support beam 106 includes a longitudinal channel 112, formed by a bottom wall 114 and side portions 116, 118. The inner side surfaces of the side portions 116, 118 slope laterally inwardly as they extend upwardly from bottom 112. This forms a pair of side grooves 120, 122 in the sides of the channel. A longitudinal bearing/seal member 124 extends longitudinally in the channel. It has side portions in the nature of longitudinal tongues 126, 128. The tongues 126, 128 and the grooves 120, 122 form longitudinally extending tongue-and-groove joints between the support members 106 and the bearing/seal members 124. Bearing/seal members 124 each also include an upper surface 130 that may be laterally convex. The upper surfaces 130 provides bearing/seal surfaces that are contacted by the beads B. The upper side portions 116, 118 of the support beams 106 may also be laterally convex, as illustrated in FIG. 6. The FIG. 6 embodiment utilizes a relatively small volume of the bearing/seal material. Like the FIG. 1 embodiment, it includes vertically diverging spaces between the bottoms of the upper side portions 20, 22 of the conveyor slats 10 and the upper surface 130 and the adjoining upper surfaces on the side parts 116, 118. The expansion of these spaces, together with the laterally convex nature of the upper surfaces 130, facilitates the movement of particulate material from the region between adjacent conveyor slats 10 to the avenues between the support beams 106 and the depending legs 24, 26 of the conveyor slats 10, leading down to the ground below the conveyor.

The embodiment of FIG. 7 is basically like the embodiment of FIG. 2. The only difference is in the construction of the bearing/seal member 80'. It has longitudinal side slots 132, 134 that are like side slots 82, 84 in the embodiment of FIG. 2. Its laterally projecting side portions include cutout regions 138, 140 that are like the cutout regions 90, 92 in the embodiment of FIG. 2. The difference is in the construction of the laterally convex upper surface of the bearing/seal member 80'. In the embodiment of FIG. 2, the upper surface 78 is rounded. In the embodiment of FIG. 7, the convex upper surface 136 is formed by a substantially flat center region flanked by outwardly and downwardly sloping side regions. As in the earlier described embodiments, the convex nature of the surface 136 facilitates movement of the particulate material away from the region of the bead B. The open areas 138, 140 allows the material to fall downwardly into the spaces between the support beams 14 and the adjacent depending legs 68, 70 of the conveyor slat 62.

The embodiment of FIG. 8 includes yet another construction of the bearing/seal member 80". In other respects, the system is like the systems disclosed by FIGS. 2 and 7. The conveyor slat construction may be the same as in the earlier embodiments. The bearing/seal member 80" may have a laterally convex upper surface 136' that may be formed by connecting flat and sloping sections, as in the embodiment of FIG. 7, or, the upper convex surface may be a rounded surface such as shown by FIGS. 1 and 2. In the embodiment of FIG. 8, the bearing/seal members 80" include downwardly and inwardly sloping side flaps 142, 144 that extend longitudinally along its opposite sides. The flaps 142, 144 have some resiliency and they make a resilient contact with the conveyor slat flanges 64, 66. This contact urges the conveyor slat 62 downwardly and urges the depending beads B into a sealing contact with the bearing/seal surfaces of the bearing/seal members 80", even when there is no load on the conveyor slats 62.

Figure 9:
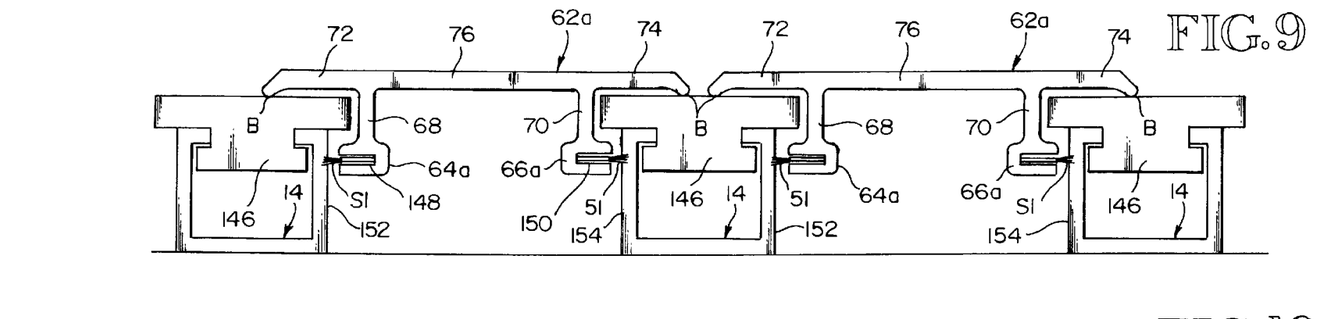
FIG. 9 is a view like FIGS. 1, 2 and 5–8, but of another embodiment of the invention.
Figure 10:
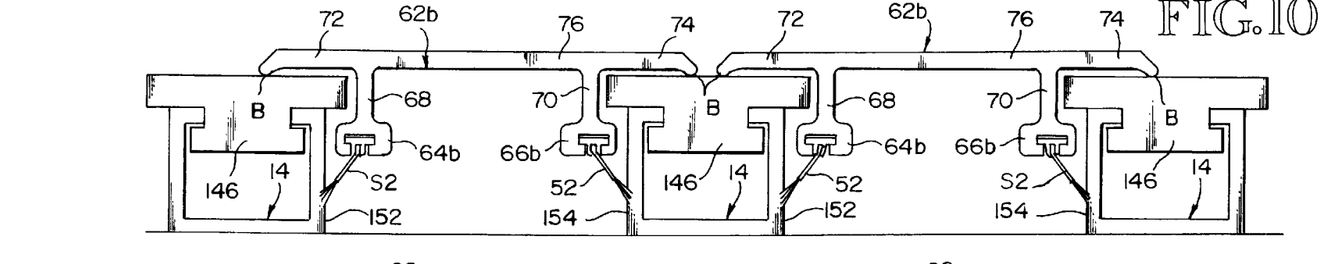
FIG. 10 is a view like FIGS. 1, 2 and 5–9, but of a further embodiment of the invention.
Figure 11:
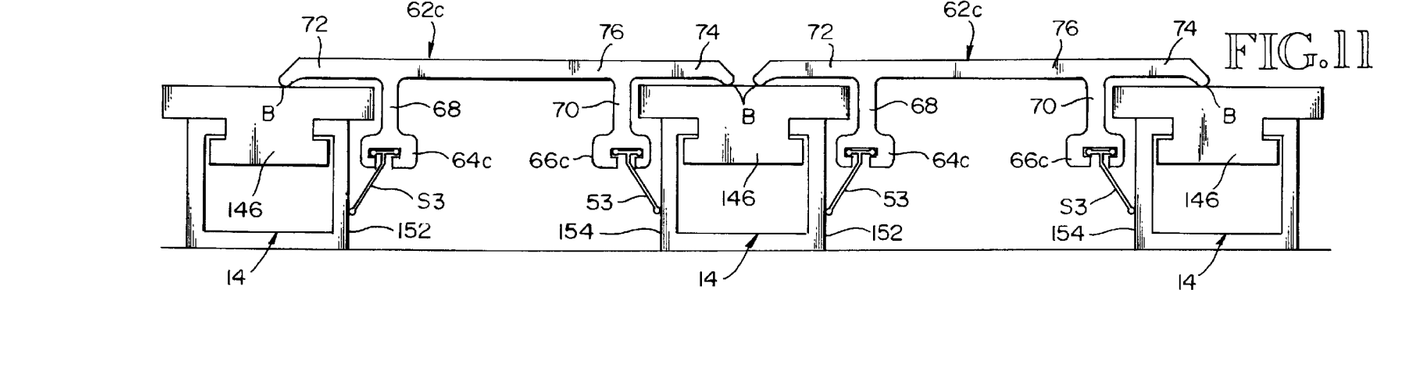
FIG. 11 is a view like FIGS. 1, 2 and 5–10, but of an additional embodiment of the invention.

The embodiments of FIGS. 9–11 are shown to include flat top bearing/seal members 146 which are connected to longitudinal support beams 14 by tongue-and-groove connections of the type previously described. For that reason, the tongue-and-groove connections will not be described again with respect to the embodiments of these figures. In these embodiments, the conveyor slats 62a, 62b, 62c are basically like the conveyor slats 62 in the embodiments shown by FIGS. 2, 7 and 8. The difference is that the bottom flange portions 64a, 66a, 64b, 66b, 64c, 66c carry seals that extend from these bottom flanges 64a, 66a, 64b, 66b, 64c, 66c over to the adjacent side portions of the adjoining support beams 14.

In the embodiment of FIG. 9, the seal members S1 are brush seals that extend substantially horizontally. Body portions of the seals S1 are received by and retained in grooves 148, 150 that are formed in the bottom flanges 64a, 66a. Projecting outer edge portions contact adjacent side surfaces 152, 154 of adjoining support beams 14.

In the embodiment of FIG. 10, the seal members S2 are brush seals having a generally T-shaped member secured along one edge. As illustrated, this member is received within a substantially T-shaped groove formed in the bottom flanges 64b, 66b of the depending legs 68, 70. The brush seal members S2 extend at a diagonal and at their lower edges contact the side surfaces 152, 154 on the support beams 14.

In the embodiment of FIG. 11, the seal members S3 are elastomeric lip seals. They have substantially T-shaped upper edge portions which fit within substantially T-shaped slots in the bottom flanges 64c, 66c. The seal members S3 extend at a diagonal as they extend downwardly and at their lower edges they contact and slide along the side surfaces 152, 154 of the support beams 14. The relaxed shape of the seal members S3 would have their lower edges positioned at locations beyond the surfaces 152, 154. The contact of the seal members S3 with the surfaces 152, 154 tends to straighten the seal members S3. This stores energy in the seal members S3 which functions to urge or bias the seal members S3 into contact with the surfaces 152, 154.

A function of the seals S1, S2, S3 is to guard against splash-up of water and/or mud from the region below the conveyor into the region between the conveyor slats 62a, 62b, 62c and the bearing/seal members 146.

Figure 12:
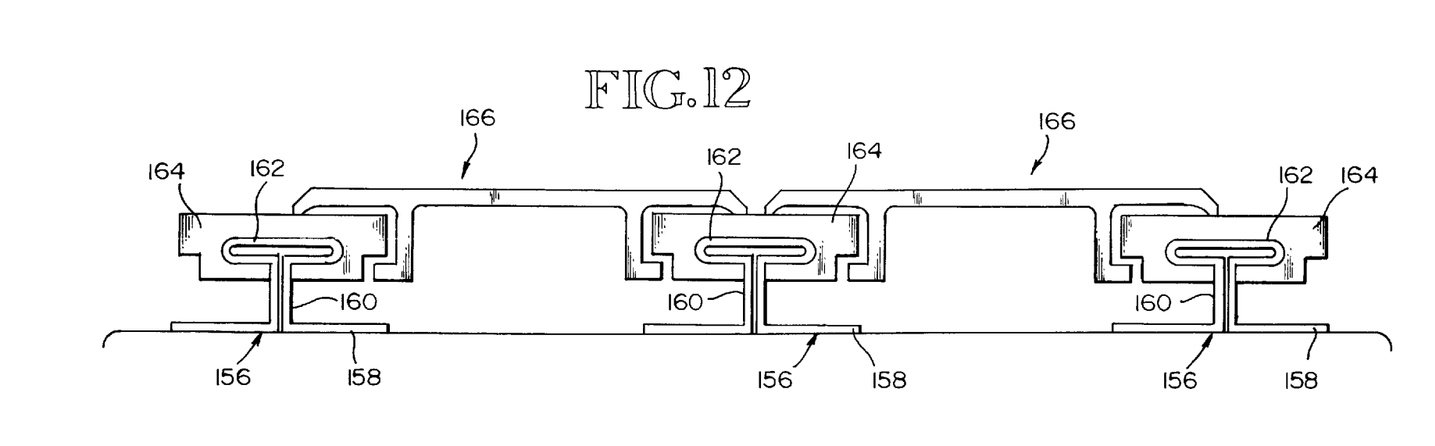
FIG. 12 is a view like FIGS. 1, 2 and 5–11, but of a further embodiment of the invention.
Figure 13:
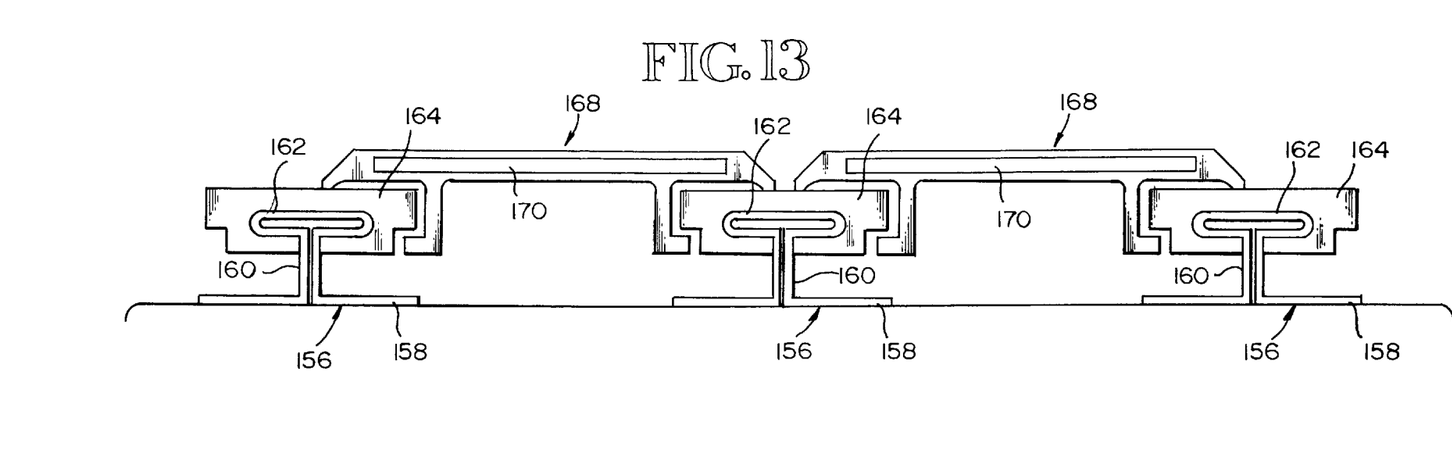
FIG. 13 is a view like FIGS. 1, 2 and 5–12, but of yet another embodiment of the invention.

In the embodiments of FIGS. 12 and 13, the support beams 156 are formed to include a relatively wide base 158, a narrow stem 160, and a relatively wide upper portion 162. In these embodiments, a longitudinal bearing/seal member 164 is formed on the upper portion 162. Bearing/seal member 164 may be formed by extrusion or pultrusion. In either case, it is formed by a die through which the support member 156 is moved. A resinous material is injected into the die and by the shape of a die cavity is formed into the shape that is illustrated in FIGS. 12 and 13. If a pultrusion process is used, reinforcement fibers are pulled through the die, together with the support member 56, as the resin is introduced into the die. Forming by pultrusion is disclosed in my aforementioned copending application Ser. No. 08/832,370. In the embodiment shown by FIG. 12, the conveyor slats 166 are preferably formed by the pultrusion process, in the manner disclosed in my aforementioned copending application Ser. No. 08/832,370. The conveyor slats 168 that are a part of the embodiment shown by FIG. 13 of the drawing are preferably also formed by the pultrusion process, with a light-weight plank member 170 being added to the top portion of each conveyor slat 168. This construction is disclosed in my aforementioned application Ser. No. 08/832,370, particularly with respect to FIGS. 12 and 13 of that application. Conveyor slats shown in the embodiments of FIGS. 1–11 may also be formed by a pultrusion process. This would give them a resin matrix that contains reinforcement fibers, in the manner disclosed in application Ser. No. 08/832,370.

The illustrated embodiments are only examples of the present invention and, therefore, are non-limitive. It to be understood than many changes in the particular structure, materials and features of the invention may be made without departing from the spirit and scope of the invention. Therefore, it is my intention that my patent rights not be limited by the particular embodiments illustrated and described herein, but rather determined by the following claims, interpreted according to accepted doctrines of claim interpretation, including use of the doctrine of equivalents and reversal of parts.

What is claimed is:

1. In a reciprocating slat conveyor composed of side-by-side conveyor slats, each having laterally outwardly extending opposite upper side portions, each including a depending, longitudinal support and seal bead with a lower edge that contacts and slides along a longitudinal bearing/seal surface on a longitudinal support beam that is below it, a conveyor structure comprising:

a longitudinal support beam positioned between each adjoining pair of conveyor slats, below adjacent upper side portions of the adjoining conveyor slats;

a longitudinal bearing/seal member on each said support beam, extending along and secured to said support beam; and a longitudinal tongue-and-groove connection between said support beam and said bearing/seal member comprising longitudinal tongues on one of said support beam and bearing/seal member and longitudinal grooves on the other;

wherein the support beam has a top portion composed of a pair of confronting, laterally inwardly directing flanges defining a longitudinal opening between them, and said longitudinal bearing/seal member having opposite side slots in which the flanges are received, an upper portion that is above the flanges and a lower portion that is below the flanges, and said flanges providing the tongue portions and the slots forming the groove portions of the tongue-and-groove connection.

2. A conveyor structure according to claim 1, wherein the upper portion of the longitudinal bearing/seal member has an upper surface that is laterally convex, said surface providing the bearing/seal surface that is in contact with the longitudinal support and seal beads.

3. A conveyor structure according to claim 1, wherein the upper portion of the longitudinal bearing/seal member projects laterally outwardly beyond opposite sides of the support beam, and said projecting portions include open areas through which material can move downwardly.

4. A conveyor structure according to claim 3, wherein the upper portion of the longitudinal bearing/seal member has an upper surface that is laterally convex, said surface providing the bearing/seal surface that is in contact with the longitudinal support and seal beads.

5. A conveyor structure according to claim 1, wherein the side portions of the conveyor slats include upper surfaces that slope downwardly and outwardly and there are lateral gaps formed between adjacent side portions of adjoining conveyor slats.

6. A conveyor structure according to claim 5, wherein the longitudinal support and seal beads are laterally rounded where they contact the bearing/seal members.

7. A conveyor structure according to claim 1, wherein the longitudinal support and seal beads are laterally rounded where they contact the bearing/seal members.

8. A conveyor structure according to claim 1, wherein the upper portion of the longitudinal bearing/seal member has an upper central surface that is substantially horizontal and upper side surfaces that slope outwardly and downwardly from the upper central surface, said upper surfaces together giving the longitudinal bearing/seal member a generally laterally convex configuration.

9. A conveyor structure according to claim 1, wherein each conveyor slat is supported on its longitudinal support beam to be able to move upwardly and provide a vertical space between its longitudinal support and seal bead and the longitudinal bearing/seal surface below such bead, said space being at least about ⅛" in height before there is conveyor slat movement blocking contact between the side portions of the bearing/seal members and the flanges on the conveyor slats.

* * * * *